United States Patent [19]

Hervé

[11] Patent Number: 5,019,265

[45] Date of Patent: May 28, 1991

[54] PROCESS FOR ACTIVATING THE OPERATION OF A SYSTEM FOR ANAEROBIC DIGESTION OF SOLID ORGANIC RESIDUES

[75] Inventor: Philip Hervé, Pignan, France

[73] Assignee: 501 Eparco S.A. Societe Anonyme de Droit Francais, Paris, France

[21] Appl. No.: 374,077

[22] Filed: Jun. 29, 1989

[30] Foreign Application Priority Data

Jul. 1, 1988 [FR] France .................................. 88 08940

[51] Int. Cl.$^5$ ................................................ C02F 3/28
[52] U.S. Cl. ................................... 210/603; 210/610; 210/616; 210/631
[58] Field of Search ............... 210/603, 605, 606, 601, 210/609–611, 613, 602, 616–618, 630, 631, 667, 714

[56] References Cited

U.S. PATENT DOCUMENTS

| | | | |
|---|---|---|---|
| 2,059,286 | 11/1936 | Statham | 210/631 |
| 3,419,469 | 12/1968 | Humphrey et al. | 210/631 |
| 3,796,637 | 3/1974 | Fusey | 210/631 |
| 3,986,036 | 7/1976 | Liles et al. | 210/631 |
| 4,240,906 | 12/1980 | Edmondson | 210/617 |
| 4,620,931 | 11/1986 | Hirata et al. | 210/617 |

*Primary Examiner*—Tom Wyse

[57] ABSTRACT

Product for activating the operation of a system for anaerobic digestion of organic residues and especially of a septic tank or similar while being placed in this system and especially the septic tank. Its distinguishing feature is that, owing to the qualitative modification of the hydrolysis process taking place in the system and especially the septic tank, its function is to fractionate the cellulose fibers and to densify the lightest flocs which it contains, the effect of this being to decrease the volume of the sludge present in the system and especially the septic tank, at an equal solids content.

14 Claims, No Drawings

PROCESS FOR ACTIVATING THE OPERATION OF A SYSTEM FOR ANAEROBIC DIGESTION OF SOLID ORGANIC RESIDUES

FIELD OF THE INVENTION

The invention relates to a product and a process for activating the operation of a system for anaerobic digestion of solid organic residues such as especially, but not exclusively, a septic tank.

PRIOR ART

Septic tanks and methods of their use are already known. A septic tank has three functions: the collection of sewage, retention of the floating wastes and solid matter and at least partial liquefaction of these floating wastes and solid matter. Lightweight matter in sewage, such as fats and lightweight particles tend to accumulate at the surface. Dense matter tends to accumulate at the bottom of the septic tank. By virtue of the bacteria present in the septic tank, the accumulated or deposited matter tends to be liquefied by an anaerobic fermentation process. Thus solubilized, this matter can be discharged with the decanted water directed towards a spreading system on leaving the septic tank. This fermentation process not only tends to reduce the volume of the accumulated or deposited matter, owing to liquefaction, as desired, but also tends to produce malodorous gases which make it possible to transfer the carbon especially from the liquid phase to the gaseous phase, which reduces pollution accordingly. The bacteria present in the septic tank originate essentially from the fecal matter itself. Starting with this natural and continuous seeding which results from the actual use of the septic tank, a bacterial flora adapted to its operation develops in the septic tank.

Attempts have been made to improve the operation of septic tanks. To this end, it was firstly proposed to optimize the design of the septic tank itself, especially by adapting its structure and its dimensions. However, this frequently resulted in complicating the septic tank, with the disadvantages resulting therefrom, without the actual effectiveness being proven.

Next, it was proposed to introduce into the septic tank products intended to activate its operation. For example, document CA 1,086,434 refers to coal dust promoting the digestion of anaerobic bacteria. Document FR 2,338,227 refers to a product based on citric acid which activates the action of the microorganisms. Document FR 2,190,742 refers to the addition, into the septic tank, of doses of active strains of microorganisms. Document WO 87/05,592 refers to the use of an adsorbent hydrophobic zeolite making it possible to remove substances which are toxic to bacteria. Document JP 60-114,394 envisages the use of carbide particles activating the microorganisms.

Other solutions have also been proposed, especially in documents WO 85/00,355, DE 3,106,422 and U.S. Pat. No. 3,645,769 (which envisages impregnating toilet paper with yeast so that, once in the septic tank, it promotes the development of bacteria).

Other proposals have been, as products, active bases consisting of diastases or enzymes of bacterial origin (document FR 1,268,165), or, more generally, adding exogenous bacteria to the septic tank.

A biological activator which increases the saturation density of bacteria in the septic tank has also been proposed (documents FR 2,357,490 and FR 2,599,356).

SUMMARY OF THE INVENTION

A general object of the invention is to activate the operation of systems for anaerobic digestion of solid organic residues, such as especially, but not exclusively, conventional septic tanks, by adding an appropriate product. The invention is useful in any system functionally equivalent to a septic tank insofar as the operation is concerned (that is to say comprising an anaerobic fermentation phase), but differing in use or in destination, such as purification lagoons, a liquid manure tank and settlers-digesters, no limitation being implied by this list. A goal of the invention is to improve this activation.

To this end, the invention provides a product for activating the operation of a system for anaerobic digestion of solid organic residues and especially a septic tank or similar, while being placed in the latter, such that, owing to the qualitative modification of the hydrolysis process taking place in the system, the function of this product is to fractionate the cellulose fibers and to densify the lightest flocs which it contains, the effect of this being to decrease the volume of the sludge present in the system at an equal solids content. This product may be a biological catalyst promoting the process of methane formation, the hydrolysis process and the process of acid formation in the case of acetic acid.

The invention also relates to a process for activating the operation of such a system, especially a septic tank or similar, in which doses of the product are introduced into the system, especially the septic tank, at suitable time intervals.

Other features of this invention will be apparent from the description which follows.

The invention relates therefore to a product and a process for activating the operation of a system for anaerobic digestion of solid organic residues, especially but not exclusively a septic tank, a suitable dose of the product being placed in this system, especially in the septic tank.

As already indicated, the invention also applies to any system functionally equivalent to a septic tank but different in use or destination. The expression "septic tank" in the text should be understood as meaning not only a septic tank, in accordance with common usage, but also such functionally equivalent systems, the description being given particularly for the case of a septic tank.

The product according to the invention may firstly be defined by its functional properties and the effects obtained by the use thereof in the particular case of application of a septic tank.

A first function of the product, obtained by the qualitative modification of the hydrolysis process taking place in the septic tank, is to fractionate the cellulose fibers and to densify the lightest flocs which the septic tank contains. The effect of this function is to decrease the volume of the sludge present in the septic tank, at an equal solids content. The cellulose fibers are those contained in the fecal matter itself or else those contained in the toilet paper. The hydrolysis process, to which reference is made in what follows, generally makes it possible to convert the solid compounds forming the sludge—and especially those based on cellulose—into soluble compounds of lower molecular weight (such as glucose). This process is effected by virtue of the bacteria present in the septic tank, which bacteria release exoenzymes into the septic tank. These bacteria are essentially those originating from the fecal matter itself. The product according to the invention does not therefore need to comprise bacteria which are added to those naturally present in the septic tank, as a result of its use, and the process according to the invention does not necessarily comprise a stage of addition of exogenous bacteria other than those originating from the fecal matter itself, as follows from the operation of the septic tank.

The fractionation of the cellulose fibers by the product introduced into the septic tank makes it possible to obtain cellulose fibers of shorter length, with the result that the sludge has a structure which is less expanded.

The product according to the invention is also a biological catalyst. This catalyst can firstly have as its prime function the promotion of the process of methane formation taking place in the septic tank, and this has the effect of removing the volatile fatty acids produced. The process of methane formation takes part in the liquefaction of the sludge and leads to the production of methane from acetic acid and the carbon dioxide and hydrogen gases present in the septic tank. By virtue of the product whose function is to promote the process of methane formation it is possible to eliminate excess volatile fatty acids, and this contributes to activating the operation of the septic tank.

In combination with this first function consisting in promoting the process of methane formation, the biological catalyst can also fulfill a second function, consisting in promoting the hydrolysis process, the direct effect of which is the decrease in the mass and in the volume of the sludge present in the septic tank.

Lastly, the biological catalyst may also have as its third function the promotion of the process of acid formation, taking place in the septic tank. The process of acid formation is the process by which the soluble compounds released by the hydrolysis process are converted into volatile fatty acids, the main one of which is acetic acid. Where appropriate, these volatile fatty acids also include propionic acid and especially butyric acid, in large quantities. These propionic and butyric acids, in particular, must be converted into acetic acid before undergoing the process for producing methane, as already indicated. The accumulation of the acids produced by the process of acid formation can be detrimental to the process of methane formation, beyond a certain upper limit of the order of, for example, 2 to 3 grams per liter. This is the case with propionic and butyric acids, already referred to, which are more difficult to metabolize than acetic acid. The activation of the process of acid formation takes place precisely for the benefit of acetic acid and does not lead to an additional production of propionic acid and butyric acid.

The function consisting in promoting the process of methane formation can be present by itself. On the other hand, the functions performed in relation to the processes of hydrolysis and acid formation can be present only simultaneously with the function concerning the process of methane formation; otherwise, a rather undesirable accumulation of volatile fatty acids would be produced. However, the function consisting in promoting the process of methane formation can, on its own, be insufficient, in certain conditions, for suitable removal of volatile fatty acids. This is the case, for example, when the septic tank is undersized or when the level of the sludge is too high to permit a removal of excess volatile fatty acids with the decanted water. In the case where the concentration of volatile fatty acids increases, the process of methane formation is inhibited and there is a risk that the hydrolysis process itself will be ultimately inhibited. In this case, when liquefaction of the solid matter no longer takes place, a complete clogging of the septic tank is inevitable; and such a clogging is avoided, and the septic tank operates satisfactorily precisely by virtue of the use of the product according to the invention. The same product can simultaneously fulfil its function(s) as a biological catalyst, as just described, as well as the qualitative modification of the hydrolysis process together with the function of fractionating the cellulose fibers and of densifying the lightest flocs, as also already described.

Such a product for activating the operation of a septic tank having thus been described functionally can form the subject of numerous embodiments capable of performing, wholly or partially, and to a greater or lesser degree, the functions referred to.

Various structural embodiments of such products are described, it being stressed nevertheless that these embodiments are purely by way of guidance and do not imply any limitation.

DESCRIPTION OF EMBODIMENTS

In one embodiment, the functional product described above is an inorganic, solid product which has a specific surface area of between approximately 20 and 120 and especially 32 and 101 square meters per gram ($m^2/g$); a cation exchange capacity of between 5 and 80 and especially 14 and 64 meq/100 grams; a percentage of volatile matter in the solids content of between approximately 2 and 12 and especially 4.8 and 9.9%; a pH in water of between approximately 6.5 and 8 and especially 6.9 and 7.9; and a redox potential in water of between approximately 0 and $-600$ and especially $-130$ and $-480$ mV.

In addition, such a product may have chiefly a particle size substantially in the range from 16 to 64 $\mu$m or thereabouts.

As for its composition, such a product may comprise, as a percentage in the solids content, between approximately 0.1 and 6 and especially 0.2 and 5.4 of calcium and between 0.06 and 5.5 and especially 0.07 and 5.12 of magnesium.

The percentage of potassium in the solids content is of the order of 0.03 to 3.

In another embodiment the product consists essentially of natural aluminum silicates and, in this case, the percentage of silica in the solids content may be of the order of 20 to 30 or 40.

It should be noted that, with regard to the physicochemical characteristics of the product, there exist rather positive factors and rather negative factors in relation to the application which is performed in a septic tank with a view to activating its operation. The parameters which play a positive part are most especially a high specific surface area, a high cation exchange capacity, a high negative redox potential, a substantial particle size fraction in the range 16 to 64 $\mu$m or thereabouts, as already indicated, or a proportion which is as high as possible in this range; and, lastly, copper, zinc, sodium, calcium, magnesium, potassium, titanium and aluminum contents which are high while remaining limited to avoid, for example, toxic effects beyond a certain threshold. Conversely, certain physicochemical parameters have a negative effect. These parameters which play a negative part are a high percentage of volatile matter, a pH in water outside the range 6.5 to 8 or thereabouts, the particle size fractions situated outside the range 16 to 64 μm, already mentioned above, and, lastly, high silica, phosphorus and iron contents. It should be noted here, however, that too low a silica content would also have a negative effect.

By balancing these factors, excellent results have been obtained with a product characterized by a very high copper content, high ratios of zinc and aluminum, low phosphorus, iron, sodium, calcium, magnesium and potassium contents, few constituent particles between 64 and 192 μm and, on the other hand, a substantial proportion of particles between 0 and 16 μm, a high silica content, a low specific surface area and a low cation exchange capacity, it being explained that the notions of high and low content are only relative here. The product considered may, for example, have a specific surface area of the order of 32 m$^2$/g, which is, in the absolute sense, fairly high, but rather low in relation to other comparable products.

In fact, a high specific surface area and a high cation capacity tend to promote the exchange and absorption phenomena. A strongly negative redox potential creates a favorable environment for anaerobic bacteria, which always develop in systems with a negative potential. Coarse particles, that is to say those of large particle size, tend to interfere with obtaining a high specific surface area and consequently have a rather low cation exchange capacity. The smallest particles, which approach the size of the bacteria themselves, are less favorable for fixing the latter. Accordingly, the range 16–64 μm has been considered as a suitable compromise for fixing the bacteria, the specific surface area, the cation exchange capacity and the microporosity.

A high silica content is not very favorable, especially because it is linked either with the presence of vitrified matter giving relatively inactive coarse particles, or with silica dust, which is intrinsically relatively functionally inactive.

These characteristics having been shown, it will be understood that it may be possible to provide different structures of products in accordance with the invention, all these structures being included within the scope of the present invention as long as they perform the above-mentioned functions. For example, a product according to the invention may have a moderate specific surface area, which would be rather negative, this being compensated by a very high copper content and a very low redox potential, which is positive. A very negative redox potential can result from metal elements such as copper and zinc present in the product, with copper playing a positive part and zinc a negative part. Moreover, zinc, being an oligo-element, could promote the bacteria.

As a particular illustrative case, there may be mentioned a product of the general type referred to above, which gives excellent results and whose physicochemical parameters have the following values:

Specific surface area: 32 m$^2$/g
Cation exchange capacity: 14 meq/100 g
Percentage of volatile matter in the solids content: 9.5% VM
pH in water: 6.9
Redox potential in water: −480 mV
Percentage of calcium in the solids content: 0.19%
Percentage of magnesium in the solids content: 7%
Percentage of potassium in the solids content: 0.036%
Percentage of sodium in the solids content: 0.021%
Percentage of iron in the solids content: 1.52%
Percentage of aluminum in the solids content: 12.61%
Percentage of silica in the solids content: 27.3%
Percentage of titanium in the solids content: 3.3%
Parts per million of manganese: 85 ppm
Parts per million of copper: 2,150 ppm
Parts per million of zinc: 4,588 ppm
Parts per million of phosphorus: 4.38 ppm.

Such a product comprises natural aluminum silicate or an equivalent. It is obvious, however, that this does not limit the invention.

The invention also relates to a process for activating the operation of a septic tank (in the sense mentioned above). According to this process, doses which are appropriate to the said product are introduced into the septic tank at suitable time intervals.

For example, in the case of a septic tank corresponding to use by four people, with normal usage of the lavatories, that is to say normal usage of the septic tank, the process according to the invention is effective, using the particular product defined above, with a unit dose of the order of approximately from 35 to 40 grams, introduced into the septic tank at approximately weekly intervals, one additional weekly dose being added per four additional people.

Trials of the particular product defined above, used according to the process which is also defined, have shown the effectiveness obtained for activating the operation of the septic tank, compared with a control without the product. This effectiveness is reflected especially in the following effects: good equilibrium of the various stages of the anaerobic digestion of the septic tank, activation of the bacteria and enzymes contributed naturally by the fecal matter (more than 15,000 billion bacteria per day and per person), reduction in the sludge volume, decrease or elimination of bad smells, and reduction in the risks of clogging of the undersized or momentarily overloaded septic tank.

Comparative trials have been carried out with the product and the process according to the invention and certain different commercial products intended for septic tanks, and, in general, it has been found that a greater effectiveness is obtained with the invention. This greater effectiveness is reflected especially in the fact that these commercial products promote the production of butyric and propionic acids, which runs counter to a good biological equilibrium of the septic tank and can only aggravate the situation of a tank which is already clogged or on the point of being clogged. The additional bacteria, exogenous to the fecal matter which may be added, do not play a crucial part. It may avoid an eventual apparent effect which, however, is not verified by a reduction in the time needed for the anaerobic digestion of the sludge, which could be indicated by a decrease in the residues. On the contrary, a certain increase in the volume of the sludge, both fresh and at the end of methanization, is frequently found.

The invention has been described essentially with reference to the product representing the "active principle" suitable for promoting the operation of a septic tank. Such a product or such a type of product may be used by itself (a single product or several different products, but each one active). However, such a product or such a type of product may also be used by virtue of a composition which comprises it. Such a composition then comprises, in addition to at least one such product according to the invention, at least one other different associated product. This other product may be inert or, on the contrary, functional in relation to the application considered. It may be, for example, a filler performing the function of an excipient, or a carrier, including solid or liquid, no limitation being implied by the list, where appropriate, this other product may include exogenous bacteria, although experience has demonstrated that these not only are not indispensable but may even have an effect counteracting the active principle of the product according to the invention. The invention also relates to such compositions, as long as they comprise at least one product such as defined above, even if such a composition is finally of more limited effectiveness than that of the product according to the invention by itself, either because the product according to the invention forming the "active principle" is "diluted" in the composition such as employed, or because the other product, not providing the "active principle" and forming part of the composition, counteracts the positive effects of the "active principle".

What is claimed is:

1. A process for enhancing the operation of a system, wherein anaerobic bacterial digestion of organic residues takes place, by qualitatively modifying hydrolysis taking place in said system, said process comprising the step of contacting said system with an inorganic solid capable of fractionating cellulose fibers and densifying flocs contained in said system so that the volume of the sludge present in the system is decreased at an equal solids content, said solid comprising an aluminum silicate and having:
    (a) a surface area of about 20 to 120 $m^2/g$;
    (b) a cation exchange capacity of about 5 to 80 meq/100 grams;
    (c) about 2 to 12 percent by weight volatile matter;
    (d) a pH in water of about 6.5 to 8; and
    (e) a redox potential in water of about 0 to $-600$ mV;
in an amount and for a period of time sufficient to enhance the operation of said system.

2. The process as claimed in claim 1, wherein said system is a septic tank.

3. The process as claimed in claim 2, wherein said septic tank is used by four people and said amount of said inorganic solid is about 35–40 g, introduced to said septic tank once weekly.

4. The process as claimed in claim 3, wherein said amount is added twice weekly for four additional people.

5. A process for enhancing the operation of a system, wherein anaerobic bacterial digestion of organic residues takes place, by promoting methane formation in said system, said process comprising the step of contacting said system with an inorganic solid capable of catalyzing the process of methane formation taking place in said system so that volatile fatty acids are removed from said system, said solid comprising an aluminum silicate and having:
    (a) a surface area of about 20 to 120 $m^2/g$;
    (b) a cation exchange capacity of about 5 to 80 meq/100 grams;
    (c) about 2 to 12 percent by weight volatile matter;
    (d) a pH in water of about 6.5 to 8; and
    (e) a redox potential in water of about 0 to $-600$ mV;
in an amount and for a period of time sufficient to enhance the operation of said system.

6. The process as claimed in claim 5, wherein said solid is also capable of catalyzing hydrolysis taking place in said system so that the mass and volume of sludge present in said system is decreased.

7. The process as claimed in claim 6, wherein said solid has a particle size of about 16 to 64 $\mu$m.

8. The process as claimed in claim 6, wherein said solid is also capable of qualitatively modifying hydrolysis taking place in said system by fractionating celluous fibers and densifying flocks contained in said system so as to decrease the volume of such present in said system at an equal solids content.

9. The process as claimed in claim 5, wherein said solid is also capable of promoting acetic acid formation in said system.

10. The process as claimed in claim 9, wherein said solid is also capable of qualitatively modifying hydrolysis taking place in said system by fractionating celluous fibers and densifying flocks contained in said system so as to decrease the volume of such present in said system at an equal solids content.

11. The process as claimed in claim 5, wherein said solid is also capable of qualitatively modifying hydrolysis taking place in said system by fractionating celluous fibers and densifying flocks contained in said system so as to decrease the volume of sludge present in said system at an equal solids content.

12. The process as claimed in claim 5, wherein said system is a septic tank.

13. The process as claimed in claim 12, wherein said septic tank is used by four people and said amount of said inorganic solid is about 30–40 g, introduced to said septic tank once weekly.

14. The process as claimed in claim 13, wherein said amount is added twice weekly per four additional people.

* * * * *